(12) United States Patent
Curtis

(10) Patent No.: US 10,170,018 B2
(45) Date of Patent: Jan. 1, 2019

(54) CLOUD BASED SERVER TO SUPPORT FACILITY OPERATIONS MANAGEMENT

(71) Applicant: Peter M. Curtis, Bethpage, NY (US)

(72) Inventor: Peter M. Curtis, Bethpage, NY (US)

(*) Notice: Subject to any disclaimer, the term of this patent is extended or adjusted under 35 U.S.C. 154(b) by 190 days.

(21) Appl. No.: 14/812,647

(22) Filed: Jul. 29, 2015

(65) Prior Publication Data

US 2016/0036898 A1 Feb. 4, 2016

Related U.S. Application Data

(60) Provisional application No. 62/089,633, filed on Dec. 9, 2014, provisional application No. 62/031,277, filed on Jul. 31, 2014, provisional application No. 62/031,283, filed on Jul. 31, 2014.

(51) Int. Cl.
*G09B 19/00* (2006.01)
*G09B 19/24* (2006.01)
*H04L 29/08* (2006.01)
*G08B 7/06* (2006.01)

(52) U.S. Cl.
CPC ......... *G09B 19/003* (2013.01); *G09B 19/24* (2013.01); *H04L 67/10* (2013.01); *G08B 7/066* (2013.01); *H04L 67/06* (2013.01)

(58) Field of Classification Search
CPC ... H04W 76/02; H04W 48/18; H04W 72/005; H04L 5/0035; G06F 15/16
USPC ............ 709/203, 223; 370/310, 311
See application file for complete search history.

(56) References Cited

U.S. PATENT DOCUMENTS

| | | | |
|---|---|---|---|
| 3,992,786 A | 11/1976 | Greenberg et al. | |
| 5,246,643 A | 9/1993 | Inaba et al. | |
| 5,600,576 A | 2/1997 | Broadwater et al. | |
| 5,864,784 A | 1/1999 | Brayton et al. | |
| 6,304,851 B1 | 10/2001 | Kmack et al. | |
| 6,457,049 B2 * | 9/2002 | Lewis | G06Q 50/24 705/1.1 |
| 7,173,528 B1 | 2/2007 | Stewart et al. | |
| 7,177,821 B2 | 2/2007 | Ikeda et al. | |
| 7,802,065 B1 * | 9/2010 | Eatough | G06F 12/0813 711/130 |
| 8,281,993 B2 | 10/2012 | Sauerwein, Jr. et al. | |
| 8,743,130 B2 * | 6/2014 | Mahajan | G06T 11/60 345/502 |
| 9,380,442 B2 * | 6/2016 | Turtinen | H04W 8/005 |
| 9,479,548 B2 * | 10/2016 | Jensen | G06Q 10/101 |
| 9,479,549 B2 * | 10/2016 | Pearson | H04L 65/403 |
| 2003/0036983 A1 | 2/2003 | Hougen et al. | |

(Continued)

*Primary Examiner* — Tesfay Yohannes
(74) *Attorney, Agent, or Firm* — F. Chau & Associates, LLC

(57) ABSTRACT

A computer system is configured to enable users to maintain a facility. The computer system includes a computer server configured to communicate across a computer network with a plurality of mobile devices, where each mobile device is pre-configured for one of a plurality of different facilities, and a database configured to store facility data about the facilities identifying sets of equipment within each facility that a user is required to perform a maintenance check on, and parameter data associated with the equipment that is set by a user through a given one of the mobile devices during the maintenance check. The computer server enables the mobile devices to read data from the database or insert new data into the database in response to requests received from the mobile devices.

17 Claims, 10 Drawing Sheets

(56) References Cited

U.S. PATENT DOCUMENTS

| | | |
|---|---|---|
| 2004/0107114 A1 | 6/2004 | Curtis |
| 2004/0255236 A1 | 12/2004 | Collart |
| 2006/0136841 A1 | 6/2006 | Fritz |
| 2007/0219645 A1 | 9/2007 | Thomas et al. |
| 2008/0126171 A1* | 5/2008 | Baldwin ................ G06Q 10/06 705/7.14 |
| 2009/0251282 A1 | 10/2009 | Fitzgerald et al. |
| 2010/0281387 A1 | 11/2010 | Holland et al. |
| 2011/0115816 A1* | 5/2011 | Brackney ............... G06Q 10/06 345/629 |
| 2011/0137713 A1 | 6/2011 | Dalgas et al. |
| 2011/0167105 A1* | 7/2011 | Ramakrishnan ....... G06Q 10/10 709/203 |
| 2012/0023435 A1 | 1/2012 | Kneppers et al. |
| 2012/0054242 A1 | 3/2012 | Ferrara et al. |
| 2013/0331963 A1 | 12/2013 | Ahangar et al. |
| 2013/0340059 A1* | 12/2013 | Christopher .......... H04W 76/10 726/7 |
| 2015/0112923 A1* | 4/2015 | Driesen ............. G06F 17/30377 707/609 |
| 2015/0193439 A1* | 7/2015 | Gaur ................... G06F 17/3033 707/747 |

\* cited by examiner

CLOUD BASED SERVER TO SUPPORT FACILITY OPERATIONS MANAGEMENT

CROSS-REFERENCE TO RELATED APPLICATION

The present application claims priority to U.S. provisional application Ser. No. 62/031,277 filed Jul. 31, 2014, U.S. provisional application Ser. No. 62/031,283 filed Jul. 31, 2014, and U.S. provisional application Ser. No. 62/089,633 filed Dec. 9, 2014, the entire contents of which are herein incorporated by reference.

BACKGROUND OF THE INVENTION

Technical Field

The present disclosure relates to management of facility operations, and more specifically, to a cloud based server to support facility operations management.

Discussion of the Related Art

Operating mission critical facilities may involve monitoring numerous building functions and equipment on a regular basis. If an individual performing such monitoring observes that equipment is operating outside of its designed limits, various steps may need to be taken to correct the situation.

Further, comparison of equipment data with benchmark values can provide a reasonable indication that equipment is close to failing or that it is operating near or exceeding its designed limits.

In the event of emergencies, facility component maintenance shutdowns, or other site specific events, facility engineers may be required to complete procedures from memory or using paper instruction. However, since these procedures can be long and complex, they can be difficult for a human operator to perform without assistance. Further, since procedures may change over time, one or more of the operators may not have the most up to date procedure.

A cloud based server can provide a centralized source for these procedures. However, access to a network that communicates with the cloud based server is necessary and many facilities do not have such access.

Thus, there is need for a cloud based server that can support facility operations management, even when an outside network is not always available.

SUMMARY OF THE INVENTION

According to an exemplary embodiment of the invention, a computer system is configured to enable users to maintain a facility. The computer system includes a computer server and a database. The server is configured to communicate across a computer network with a plurality of mobile devices. Each mobile device is pre-configured for one of a plurality of different facilities. The database is configured to store facility data about the facilities identifying sets of equipment within each facility that a user is required to perform a maintenance check on, and parameter data associated with the equipment that is set by a user through a given one of the mobile devices during the maintenance check. The computer server enables the mobile devices to read data from the database or insert new data into the database in response to requests received from the mobile devices.

According to an exemplary embodiment of the invention, a computer system is configured to guide a user in maintaining a facility. The computer system includes a computer server and a database. The computer server is configured to communicate across a computer network with a plurality of mobile devices, where each mobile device is pre-configured for one of a plurality of different facilities. The database is configured to store procedures for each of the facilities. The computer server is configured to provide a given one of the procedures associated with a given one of the facilities and a given one of the mobile devices and information indicating a current step of the given procedure to the given mobile device upon receiving a request from the given mobile device. The computer server is configured to update the current step to a next step within the given procedure in response to information received from the given mobile device indicating that the current step has been completed.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
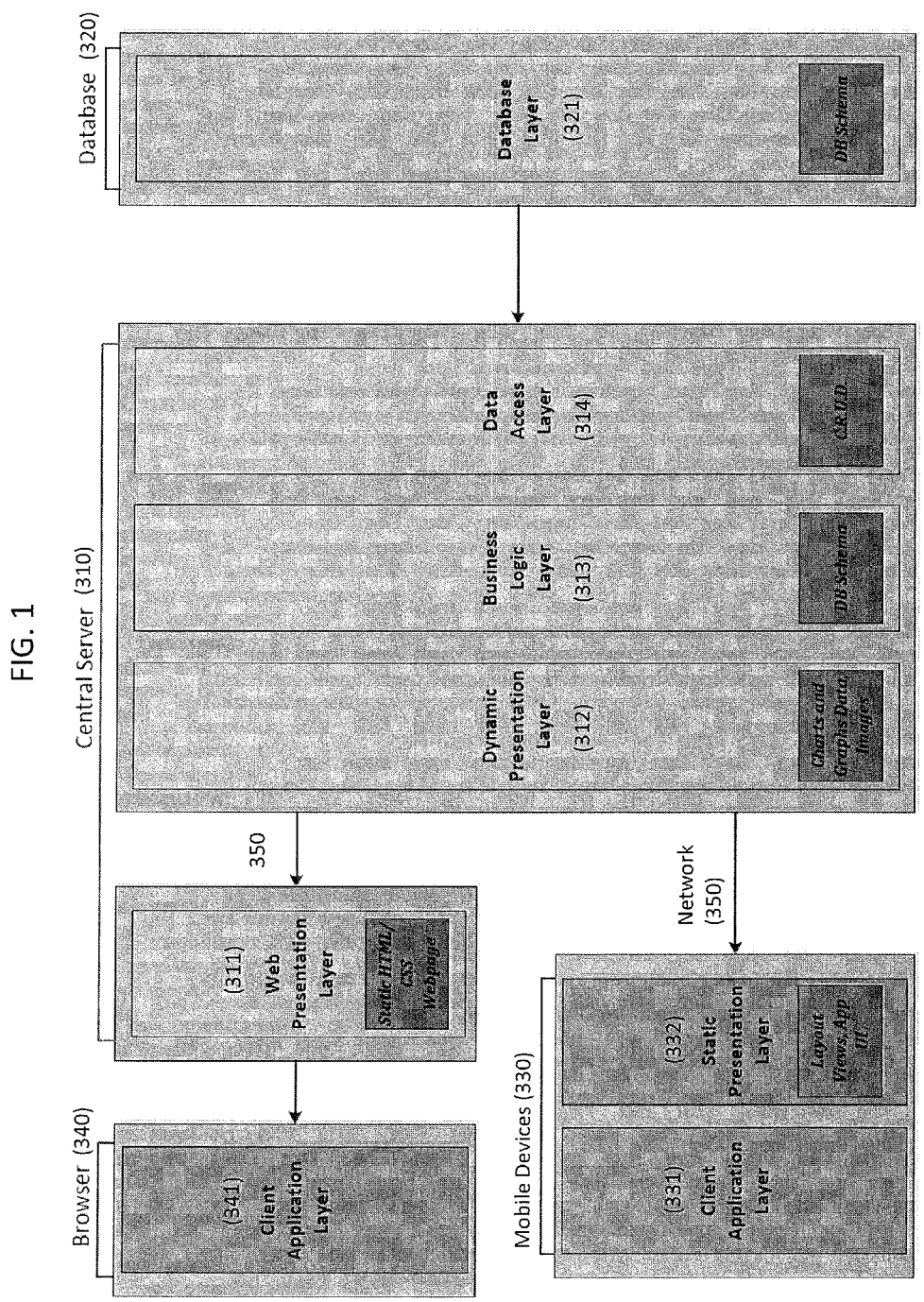
FIG. 1 is a schematic diagram illustrating a system according to an exemplary embodiment of the invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 illustrates a system having a cloud based server that supports facility management. Referring to FIG. 1, the system includes the server 310, a database 320, one or more remote mobile devices 330, a remote computer 340 (e.g., a configuration computer), and a network 350 (e.g., the Internet).

Figure 2:
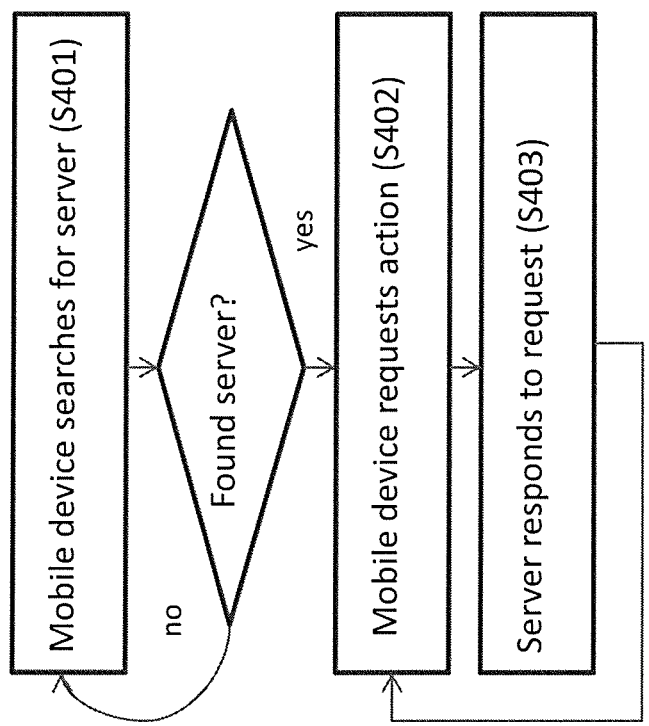
FIG. 2 illustrates a mobile device establishing a connection to the server according to an exemplary embodiment of the invention.

Since many areas of a facility may not be accessible over the Internet or not always accessible, the server 310 and mobile devices are configured to gracefully handle loss of connection to one another. Establishing a connection between a mobile device 330 and the server 310 is represented by the flow diagram shown in FIG. 2. When the mobile device 310 is connected to the network 350, it searches for the server 310 on the network 350 (S401). Upon finding the server 310, the mobile device 330 requests (e.g., sends a request message) that the server 310 perform a specific action (retrieve data, store data, etc.) (S402). The server 310 listens to the request, and responds accordingly (S403). If at any point the connection between the mobile device 330 and the server 310 is severed (e.g., mobile device 330 loses its connection to the network 350), the flow diagram terminates. If the connection is lost before the mobile device 330 begins its search for the server 310 in step S401, the mobile device 330 will not be able to find the server 310 on the network 350. In that event, the mobile device 330 resorts to using its own internal database, which is a small copy of the relevant information from the database 320 of the server 310 that was made the last time the mobile device 330 synchronized itself to the server database 320. Requests from the mobile device 330 can only insert data into the database 320 or read data from the database 320. The mobile device 330 is prevented from deleting or modifying data. For example, if equipment is listed as being present in a round, but a user performing the round notices that the listed equipment is not actually present in the facility, the equipment cannot be deleted by the user. The missing equipment could however be deleted from the facility configuration on the server 310 by an administrator on a remote computer 340. For example, if equipment is listed as being present in a round, but a user performing the round notices that the listed equipment is of a different type than what is actually present in the facility, the type of the equipment cannot be updated. The equipment with the incorrect type could however be updated from the facility configuration on the server 310 by an administrator on a remote computer 340. If the request is a READ, it is allowed. If the request is a DELETE or an UPDATE, then it is discarded. If the request is an INSERT, it is stored in the internal memory of the device 330 to be implemented the next time the mobile device 330 is connected to the database 320. If the connection is lost before the mobile device 330 requests its action, the flow diagram terminates. If the connection is lost after the mobile device 330 makes the request but before the server 310 responds to the request, the mobile device 330 will receive no acknowledging response from the server 310 and assume the action was not performed. The mobile device 330 will attempt to redo the action when it re-establishes a connection to the server 310, and the server 310 will respond to indicate it has already performed the action or the server 310 performs the action and sends a corresponding acknowledge to the mobile device 330.

The server 310 includes a web presentation layer 311 to interface with a browser of the remote computer 340. The server 310 further includes a dynamic presentation layer 312 to interface with the static presentation layer 332 of each mobile device 330 and the web presentation layer 311. The server 320 further includes a business logic layer 313 and a data access layer 314 to interface with a database layer 321 of the database 320.

The server 310 has a database 320 that serves as a consistent reference and data bank for documents that applications (e.g., of the mobiles devices 330) can synchronize with. For example, when a mobile device 330 has access to the network 350, it can retrieve data from the database 320 or store data to the database 320.

Technical staff and clients can upload their data (e.g., data captured during a walkthrough) to the server 310 using a mobile device 330 so this data can be synchronized with other data captured by other mobile devices 330. This allows the system to quickly troubleshoot an issue with the data.

In an exemplary embodiment, the server 310 uses NGINX, which is a high-performance Hypertext Transfer Protocol (HTTP) server and reverse proxy, as well as an Internet Message Access Protocol (IMAP)/Post Office 3 protocol (POP3) proxy server. Unlike traditional servers, NGINX doesn't rely on threads to handles requests and instead uses a scalable event-driven (asynchronous) architecture. Because the events are asynchronous, the server 310 can handle changes from the web client as well as mobile devices separately, irrespective of the order in which the requests to the server 310 were made.

NGINX allows for features such as HTTP load balancing and caching, which allows the server to do more for less in terms of value. NGINX allows for flexibility in configuration with features such as reverse proxying to host many services on different ports. The server 310 using NGINX also supports a secure sockets layer (SSL), which can be utilized to ensure communications are secure. NGINX is a reverse proxy server provided to the user. While the server 310 is described above as using NGINX, the server 310 is not limited to NGINX as other server programs may be used.

In an exemplary embodiment, the dynamic presentation layer 312, which manages and provides an interface for the web front-end and the client application of the mobile devices 330 is based on NODEJS (e.g., node.js), which is a platform for building fast, scalable network applications.

NODEJS uses an event-driven, non-blocking I/O model that makes it lightweight and efficient, and good for data-intensive real-time applications, which run can across distributed devices. While a client application of the mobile device 330 is described above as being based on the NODEJS platform, the client application is not limited to being based on the NODEJS, as other software platforms may be used.

The database 320 includes two different databases, a relational model database system (RDBMS) and a Document-based database (e.g., non-relational or "NoSQL" database). In an exemplary embodiment, the RDBMS is an SQL database such as MYSQL, SQLite, etc. However, the RDBMS is not limited to MYSQL or SQLite as other relational databases may be used. In an exemplary embodiment the Document-based database is MONGODB. However, the Document-based database is not limited to MONGODB, as other non-relational databases may be used.

The use of both a RDBMS and a non-relational database allows integrity constraints to be enforced efficiently and queries in any sort of non-predetermined manner utilizing SQL. At the same time, for very high traffic activities, which consume lots of data and are focused on a particular view or presentation (such as round-readings), one can utilize the speed of the non-relational database as well as the convenience of programming in an object oriented and prototypical nature to get these tasks done effectively. In addition, using a NoSQL server for view and specific-tasks oriented processes allows for a much lighter load on the server 310.

Because the mobile devices 330 make use of their internal databases, each device will synchronize their data with the server 310 on software startup and use their own internal database going forward. It is only when rounds are completed that requests to the server 310 are made to update the server 310 with the new information. For example, the parameter data entered into the mobile device 330 for all equipment/components in a given room or floor of the facility at a given time (e.g., the 12 pm round, the 1 pm round, the night shift round, the daily round, the weekly round, etc.) could correspond to one round.

When the mobile device 330 is disconnected from the server 310, only trending and analysis on the entered data that is not overly complex or time consuming can be performed locally on the mobile device 330. When the mobile device 330 is connected to the server 310, requests to the server 310 for more complex analytics can be made. Examples of analytics that can be performed on the mobile device 330 include graphing data fields and identifying trends and spikes in data. Examples of analytics that can only be performed on the server 310 include more in depth analysis of trends by comparing multiple data fields. For example, spikes, valleys, trends, or other anomalies in the data will be compared by the server 310 so it can make intelligent suggestions to prevent problems or help the operator make informed decisions. An example of this could be a marked temperature increase in a particular area of the facility. If the algorithm also detected an increase in electrical load for the area during the same time period, then the system may alert the user of the condition and provide some remediation suggestions. For example, a possible remediation suggestion could be to increase cooling capacity for the area if the temperatures have exceeded the manufacturer's acceptable limits for the equipment in the space.

A web interface of the web presentation layer 311 facilitates the management of data within the databases on the server 310. In addition, the web interface makes it more feasible to create analytics and other types of views. In addition to assisting technical staff and helping to interpret data, the web-interface is user friendly to enable staff to quickly manage the database 320. This is a useful feature for high-level users as well who would need time-sensitive access to data for either changes or purposes of reporting.

The database 320 is configured to represent multiple facilities, areas within each facility, rooms within each facility, equipment (i.e., facility components) within each facility, room, or area, data entry fields (parameters associated with each component), rounds (e.g., a data collection session), shifts, users, comments, and documents that may be used by the client of a mobile device 330.

For example, a round corresponds to an operator walking around a facility using the mobile device 330 to enter parameter data about each piece of equipment (facility component). For example, if the operator collects data about each facility component at 12 pm, even if the data collection process takes several minutes, the mobile device 330 can store this as a single round (e.g., the 12 pm round).

The non-relational database can store operating procedures (e.g., PDF), images/drawings (e.g., JPEG, PDF, etc), contact lists, policies, sound files (e.g., WAV, MP3, etc.), video (e.g., AVI, MOV, MPEG), and license information.

The RDMBS includes relational representations of a facility, area, room, equipment (e.g., facility component), field, user, document, comment, read-by, shift, shift-schedule, and timestamps detailing when the tuple was created or modified.

The facility relational representation includes at least one of a name, an address, a geographic location (e.g., latitude and longitude), an image file location, and a tag identifier, as attributes. The image file location indicates the location (e.g., local or remote directory) of a picture or a video of the facility. For example, the tag identifier could correspond to a code that can be read from an RFID/NFC tag or a barcode/QR code tag, which identifies the facility and distinguishes it from other facilities.

The area relational representation includes at least one of a name, a reference to its containing facility, dimensions, geographic location, an image file location, and a tag identifier, as attributes. Since the area is located within a particular facility, the reference can link to a corresponding facility relational representation. The image file location indicates the location (e.g., local or remote directory) of a picture or a video of the area. For example, the tag identifier could correspond to a code that can be read from an RFID/NFC tag or a barcode/QR code tag, which identifies the area and distinguishes it from other areas within the same facility.

The room relational representation includes at least one of a name (e.g., equipment room), a reference to its containing facility or area, dimensions, a geographic location, an image file location, and a tag identifier, as attributes. Since the room is located within an area or a facility, the reference can link to a corresponding facility or area relational representation. The image file location indicates the location (e.g., local or remote directory) of a picture or a video of the room. For example, the tag identifier could correspond to a code that can be read from an RFID/NFC tag or a barcode/QR code tag, which identifies the room and distinguishes it from other rooms within the same facility.

The equipment relational representation includes at least one of a name, an equipment type (e.g., generator, UPS, PDU), a manufacturer, model number, serial number, a reference to its containing area or room, a geographic location, an image file location, and a tag identifier. Since the equipment is within a facility, area, or room, the reference can link to a corresponding facility, area, or room relational representation. The image file location indicates the location (e.g., local or remote directory) of a picture or a video of the equipment. For example, the tag identifier could correspond to a code that can be read from an RFID/NFC tag or a barcode/QR code tag, which identifies the equipment (e.g., facility component) and distinguishes it from other facility components within the same facility.

The field relational representation includes at least one of a name, a field type (e.g., integer, text, real, etc.), description, unit, value, status, lower boundary, upper boundary, nominal value, deviation tolerance, and a reference to its containing facility, area, room, or equipment, as attributes. For example, certain parameters may be relevant to a given facility, area, room, or component, and thus the reference can indicate such relevancy.

The user relational representation include at least one of a username, password, real name, email address, privilege (e.g., full access, limited access, etc.), and image file location, as attributes. The image file location indicates the location (e.g., local or remote directory) of a picture or a video of the user.

The document relational representation includes at least one of a title, a document type (e.g., SOP, manual, drawing, etc.), a reference to its containing facility, area, room, equipment, or field, and an image file location, as attributes. The image file location indicates the location (e.g., local or remote directory) of a picture or a video of the document.

The comment relational representation includes at least one of a title, message, author, comment it is responding to (if any), and a reference to a document, facility, area, room, equipment, or field, as attributes. The comment it is responding to could be a link to another comment relational representation.

The read-by relational representation details what comment was read by what user at what time, and includes or refers to the comment, the author of the comment, the identity of the reader and the time the comment was read, as attributes.

The shift relational representation includes at least one of a name (e.g., night shift, day shift, etc), a start time, and an end time, as attributes.

The shift-schedule relational representation details what shift should be performed by what user and includes at least one of the shift, the user, the time started, and time completed, as attributes.

The non-relational database includes a file system that maintains a library of facility documentation (e.g., including operating procedures, drawings, contact lists, policies, facility logs, work orders and other facility or equipment specific documentation), manufacturer documentation (e.g., including equipment manuals, maintenance manuals, manufacturer specific documentation), and enterprise documentation, which includes documents that are applicable to all facilities owned or operated by the enterprise. The files in the file system can be any type of file (e.g., .doc, .docx, .xlsx, .jpg, .pdf, .mp3, .mp4, etc.). The files may be associated with the enterprise, or one or more facilities, areas, rooms, equipment, and/or fields through the creation of a new Document tuple within the relational database.

The server 310 manages existing user accounts, the addition of new user accounts, and the deletion/modification of existing user accounts, and manages user account privileges. The server 310 can make only certain documents or certain data accessible to each user or mobile device 330.

The server 310 may be configured to provide one or more different account types (e.g., profiles) with access to different features. The server 310 may provide an analyst account that has access only to the data trending tab 220.

The server 310 may provide an associate engineer account that has the ability to record walkthrough data using the walkthrough tab 210 as well as features available to the analyst account.

The server 310 may provide an engineer account that has access to the library tab 240, portfolio tab 250, simulation tab 260, and the features of the associate engineer account.

The server 310 may provide a manager account that has access to facility rooms and equipment, is capable of creating user accounts, manages user account privileges, and is capable of configuring email alert preferences. The manager account can grant or deny access to any documentation accessible using the library tab 240 for each individual user account. The manager account also has access to all features provided by an engineer account. The server 310 may provide an administrator account that has access to all program features and tabs. The administrator account is also capable of accessing advanced configuration data including database sync setup information, outgoing email account settings, and direct access to the database files. The administrator account can create additional customized account profiles beyond the ones described above. The administrator account may be accessible using a mobile device 330 or a desktop computer (e.g., 340).

The server 310 may be configured to read in data from systems including a supervisory control and data acquisition (SCADA) system, a computerized maintenance management system (CMMS), a building management system (BMS), BACnet enabled equipment, and Modbus enabled equipment.

The server 310 manages the synchronization of all data collected by the mobile devices 330. The server 310 only synchronizes data and/or documentation that is new, or has changed. Each mobile device 330, upon getting into WIFI coverage, sends a message to the server 310 letting it know it has new/updated data. The server 310 then retrieves the newly collected/updated data from the corresponding mobile devices 330. The mobile device 330 will periodically send a message to the server 310 with a timestamp of its last sync time. Any new data since the sync time will be sent in the response from the server 310. The server 310 pushes new data to each mobile device 330. The server 310 is configured to receive a request message from the mobile devices 330 requesting that a sync operation be performed.

When a new mobile device 330 is added to the system, the mobile device 330 downloads all facility data from the server 310 to its local storage. Once a new mobile device 330 is loaded with its software, an interface of the loaded software enables the user to specify the IP address and the port number of the server 310 so it can communicate with the server 310. The client application of each mobile device 330 enables a user to configure it as a new device by selecting one of several available facilities. The identity of the selected facility can be sent in a computer message from the new device 330 across the network 350 to the server 310 and then the server 310 can send/push all the data it has for the selected facility to the mobile device 330.

There is an encrypted connection between the mobile devices 330 and the server 310. The files stored on the database 320 and the mobile devices 330 may also be encrypted. For example, a SQLCiper 256-bit AES encryption technique may be used to encrypt data in the data database 320 of the server 310 or a database of the mobile devices 330.

When a new mobile device 330 is added to the system, a license check may be performed by the server 310. The server 310 maintains several different license tiers, where each tier includes a limited set number of devices. For example, if the server 310 is initially configured to support 10 mobile devices 330, the server 310 would deny an attempt to add an $11^{th}$ mobile device 330 or ignore requests made by the $11^{th}$ mobile device. If additional mobile devices 330 are needed, a user with appropriate privileges (e.g., an administrator) can access the server 310 using the remote computer 340 (e.g., a desktop computer) and increase the number of devices for a given license tier.

Figure 3:
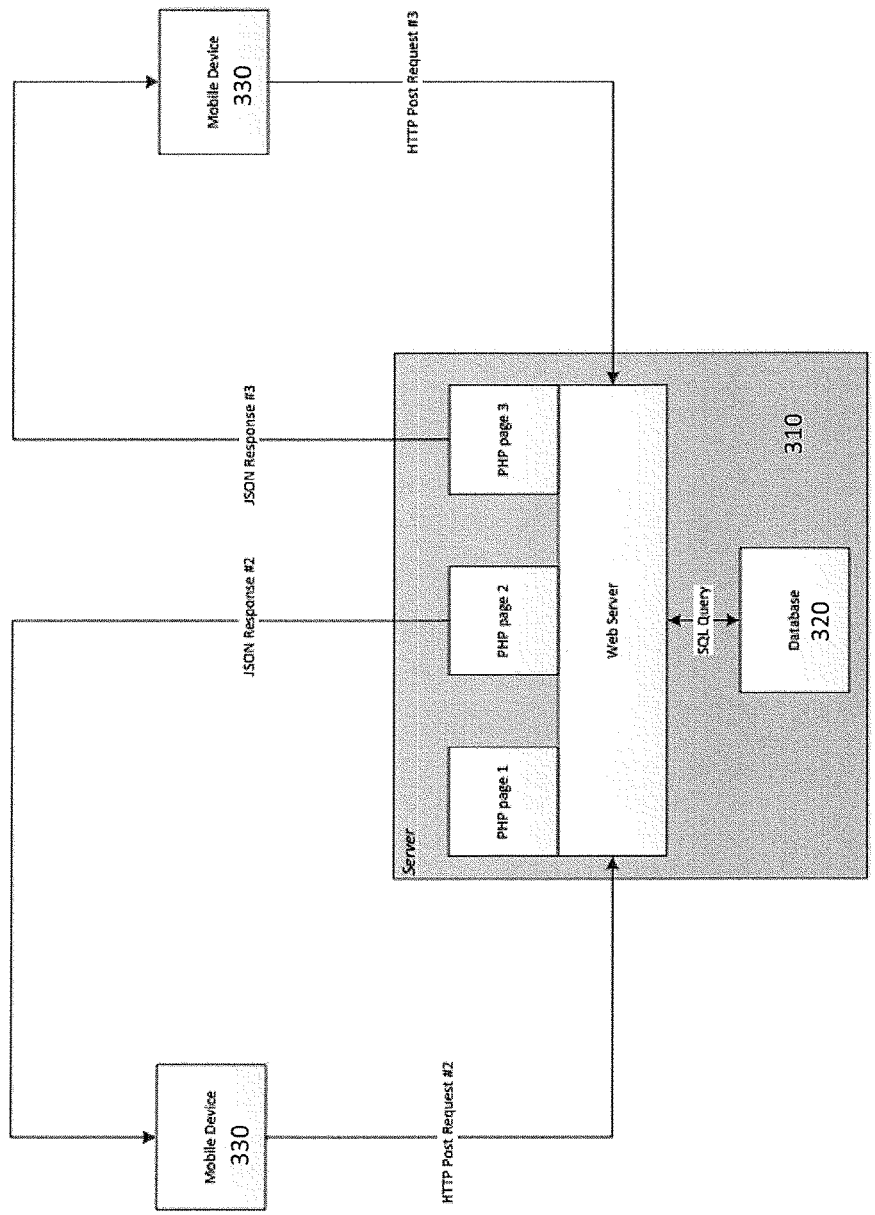
FIG. 3 illustrates a server of the system communicating with mobile devices according to an exemplary embodiment of the invention.

In an exemplary embodiment of the invention, the communication protocol between a client of a mobile device 330 and the server 310 is Java Script Object Notation (JSON). FIG. 3 shows use of JSON to communicate with the mobile devices 330. Each mobile device 330 can make one of several requests to the server 310. The requests may include different types of requests such getFacilities, getAreas, getEquipment, getClientInfo, getUsers, getRounds, getFields, fileUpload, getSectors, connect, disconnect, etc. For example, the getFacilities request may be used to retrieve data about the facility the mobile device is configured for, the getAreas request may be used to retrieve data about areas into which the facility is divided, the getEquipment request may be used to retrieve data about the equipment in the facility or within a particular area of the facility, the getRounds request may be used to retrieve a certain number of previously entered rounds of data, the getFields request may be used to retrieve labels, sizes of data entry fields, and operating ranges of the data entry fields so that a GUI can be presented on the mobile device 330 to enable the user to enter data into the proper data fields and the mobile device 330 can determine whether the entered data is within the ranges, etc. A web server in the business logic layer 313 of the server 310 maintains a different PHP page for each request. For example, a mobile device 330 can make a request by sending an HTTP Post of a request type that corresponds to the particular request to the web server. The web server, upon determining the request type of the HTTP Post, can forward the POST to the corresponding PHP page, which connects to the database 320 to make queries to respond to the request. The PHP page returns a response to the mobile device 330 that made the request using a JSON response.

The server 310 via the mobile devices 330 facilitate data collection from facility components in a facility such as an Uninterruptible Power Supply (UPS), a Power Transfer Switch (PTS), a Computer Room Air Conditioner (CRAC) units, Generators, Boilers, Electrical Switchgear, or any other types of facility components that may be included in a facility's core infrastructure.

The server 310 via the mobile devices 330 may simplify routine operational tasks and provide access to a knowledgebase customized with site specific facility documentation and benchmark data. Having this detailed documentation and benchmark data on hand can be an invaluable asset, especially when inevitable facility component failures occur. Further, during emergencies, human error may be mitigated and life safety may be increased by keeping documentation always on hand for personnel so it can be accessed easily when it is needed most.

The server 310 stores data collected by the mobile devices 330, performs data trending calculations, provides data that can be visualized on the mobile devices, performs document management, and provides interactive operational procedures including Standard Operating Procedures (SOPS), Emergency Action Procedures (EAPs), Emergency Operating Procedures (EOPs), Maintenance Procedures (MPs), Method of Procedures (MOPs) and other facility documentation.

An SOP may include best practice approaches or a set of step-by-step instructions for the day-to-day operation of the equipment (e.g., the facility components). An EAP may include step by step actions which must be done in case of an emergency. For example, an EAP could include a backup plan to aid facility management act swiftly and appropriately to determine/assess/solve the problem and prevent future occurrences of the same problem. An EOP may be designed to alleviate guess work and confusion by establishing a systematic approach for responding to emergencies. The EOP may provide instructions and guidelines for addressing a crisis or natural disasters that may occur. An MP may include guidelines for maintenance to be performed on a specific equipment (e.g., a facility component) or system. An MOP may include step-by-step procedures and conditions, including responsible personnel who should be contacted or be present, documentation, etc.

Figure 4:
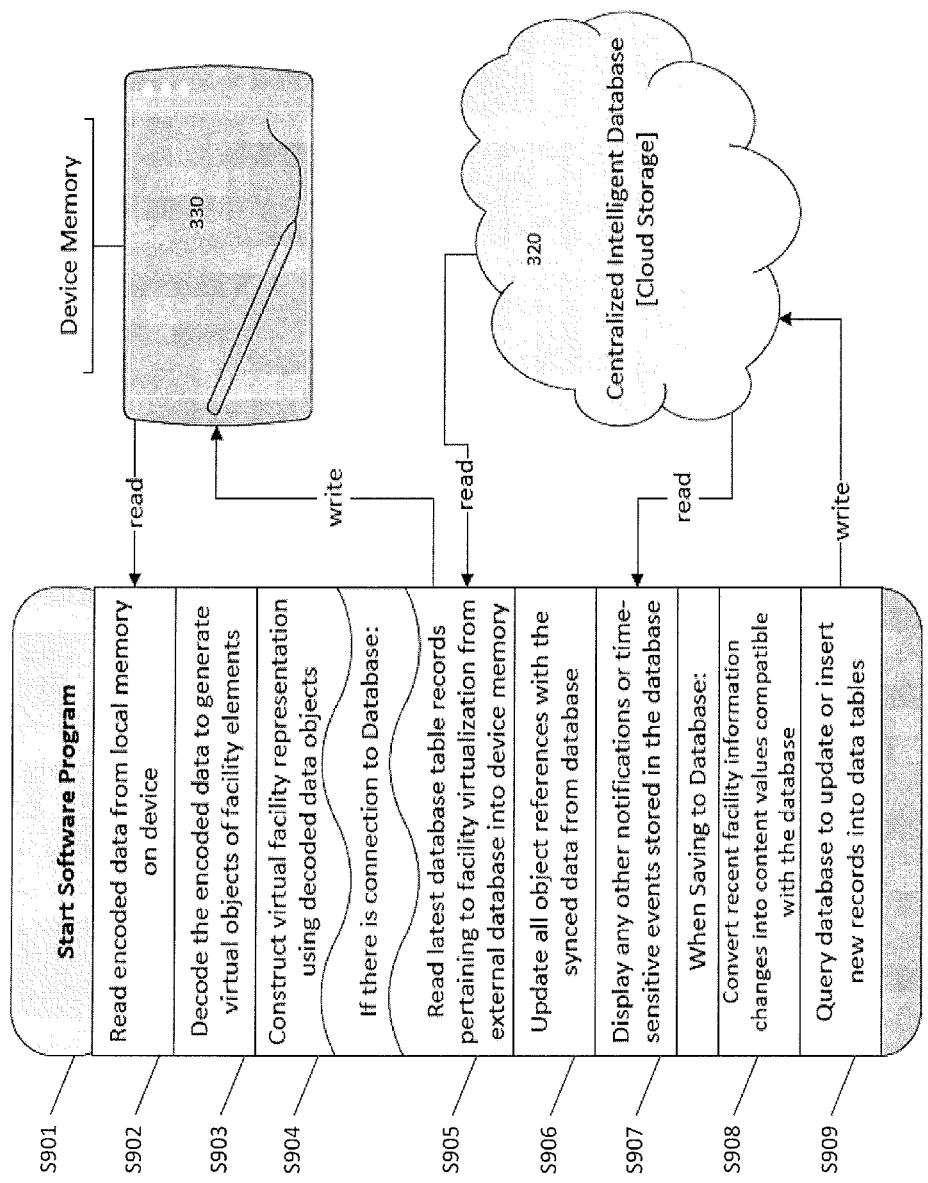
FIG. 4 shows exemplary interactions between a mobile device and a remote database of the system.

FIG. 4 shows interactions between a mobile device 330 that manages a facility and the remote database 320, according to an exemplary embodiment of the invention. Referring to FIG. 4, the client program is started on the client of the mobile device (S901). For example, an icon may be present on a display of the client that is selected with a stylus or a finger to start the client program that is executed by a processor of the mobile device 330.

Next, the client program reads data from local memory on the client, which may be encoded (S902) and the client program constructs virtual facility representations of the read data using data objects (S903). For example, if the read data includes facility components for different rooms and different floors, the client program may create facility component objects for each facility component, room objects for each room, and floor/area objects for each floor/area. A room object may link to its associated facility component objects. For example, each object may include an object identifier, and thus a room object that stores several facility components could store an object identifier for each facility component object it contains. Similarly, a floor/area object may link to its associated rooms by storing an object identifier for each room object. Similarly, a facility object may be created that links to its associated floors/areas by storing an object identifier for each floor/area object it contains.

If there is a connection to the database 320, the client program reads the latest database table records pertaining to the facility virtualization from the database 320 into its local memory (S905), updates all object references with the synced data from the database 320 (S906), and displays any notifications or time-sensitive events stored in the database (S907). The client program is configured to determine whether there is a connection to the database 320.

Saving data entered into the client of the mobile device to the database 320 may include converting recent facility information changes into context values compatible with the database 320 (S908) and querying the database to update or insert new records into the corresponding data tables (S909).

Figure 5:
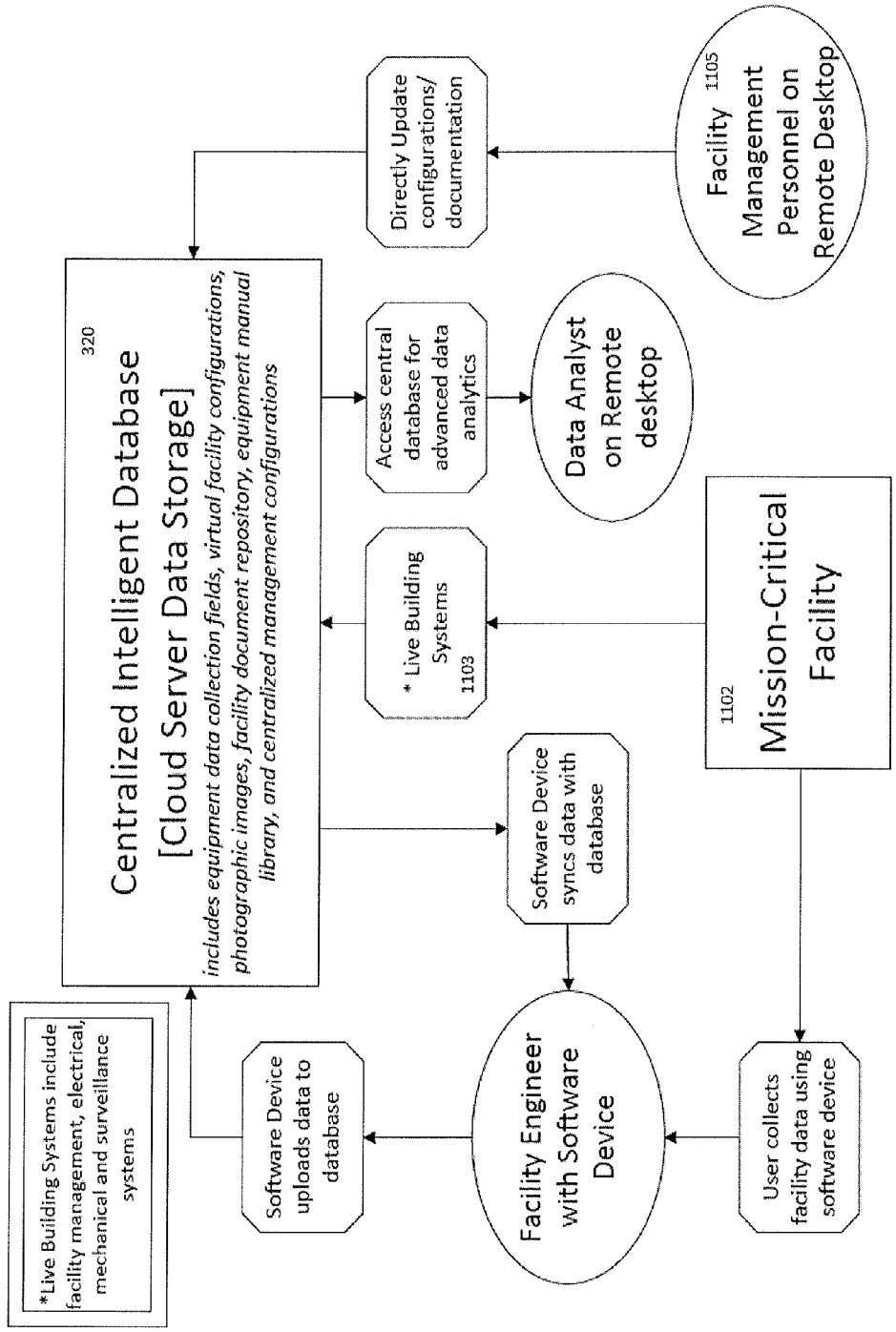
FIG. 5 shows a data synchronization model according to an exemplary embodiment of the invention.

FIG. 5 shows a data synchronization model according to an exemplary embodiment of the invention, which shows exemplary interactions between the database 320, a facility 1102, a live building system 1103, an analyst 1104, facility management personnel 1105, and the mobile device 330.

As shown in FIG. 5, after data is entered by the facility engineer using the mobile device 330 during a walkthrough of the facility 1102, the client of the mobile device 330 may upload the data to the database 320, and data entered into the database 320 by other mobile devices 330, a live building system 1103, or the facility management personnel 1105 may be sent to one or more of the clients, for update of their local databases.

The live building system 1103 may include facility management, electrical, mechanical, and surveillance systems. The data analyst 1104 may access (e.g., read or update) the central database (e.g., 320) from a remote computer (e.g., 340). The facility management personnel 1105 may update the central database 320 from a remote computer (e.g., with various facility component configurations or documentation).

The client of a mobile device 330 may periodically or on request retrieve a snapshot of data for one or more rooms of the current facility stored in the remote database 320 for local storage. For example, if two users are performing data collection on different rooms/floors/areas of the facility, the periodic or on request retrieval allows the current user to work with the most current up to date data.

The database 320 can be access restricted, and customized such that certain accounts only have access to certain files and documents. Further, the information on the database 320 may be encrypted and password protected. For example, even though an account may have access to the database 320, it may not have access to all tables of the database 320 or certain data fields.

Figure 6:
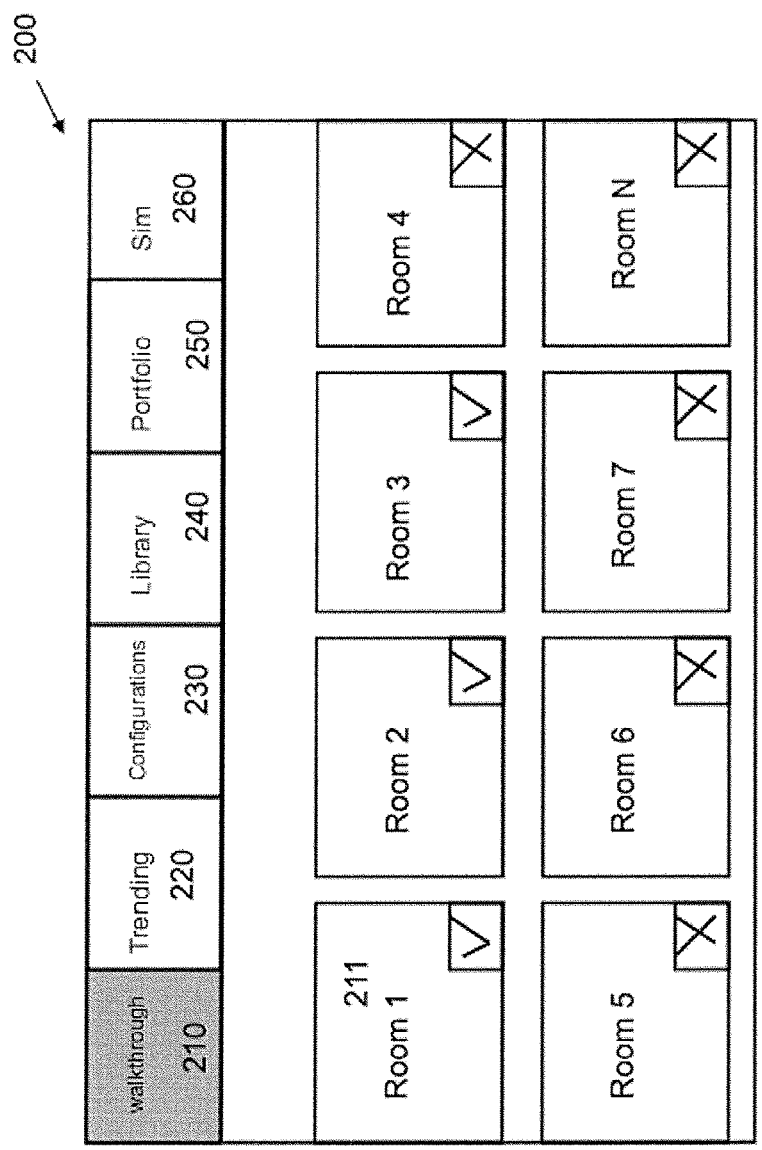
FIG. 6 shows an example of a possible user interface that may be presented on the mobile device.

FIG. 6 illustrates an example of a possible graphical user interface (GUI) 200 that can be presented on the mobile device 330. The GUI 200 includes a walkthrough mode 210 that is selected to enable the user to configure their facility into separate rooms. Each of the rooms may be represented by selectable room buttons 211. When the user selects one of the room buttons 211, images of the electrical and mechanical apparatuses that are associated with the selected room will appear. The images are stored on the server 310, and are uploaded from the server 310 to the mobile device 330 when the mobile device 330 is initially configured for the facility, and can be updated if necessary by the server 310, whenever the image changes and the mobile device 330 is connected to the Internet.

Each room button 211 may provide a graphical indicator indicating whether the room has already been configured (e.g., a check) or has yet to be configured (e.g., an 'x' or a blank box). However, the invention is not limited thereto. For example, the graphical indicators illustrated in FIG. 6 are merely examples, as other graphical symbols or text may be used to convey the same information.

The user of the mobile device 330 may also upload facility floor layout plans from the database 320 to be used for navigation of this screen. The user may configure areas of the floor layout plan to correspond to rooms within the facility. Selecting the room from this view will display the electrical and mechanical apparatuses as previously described.

Selection on one of the available room buttons 211 brings up a new interface screen that enables the user to enter a new facility component that is housed within the corresponding room, or view/edit facility components that were previously entered (e.g., either manually or automatically).

Further, one or more of the facility components in the rooms may be pre-loaded automatically using default facility component templates or site templates. The templates may be stored in the database 320 and uploaded to the mobile device 330. The default facility component template may be used by the GUI 200 to provide the user with a list of available facility components. Custom facility component fields may also be created by the user and/or added to the default facility component template. The custom facility component fields can be stored to database 320 so that they are accessible to another mobile device 330 of the same facility. In this way, each room may be configured to accommodate a unique facility component setup (e.g., UPS, PTS, switchgear, generator, power distribution unit PDU, boiler, chiller, etc.).

Figure 7:
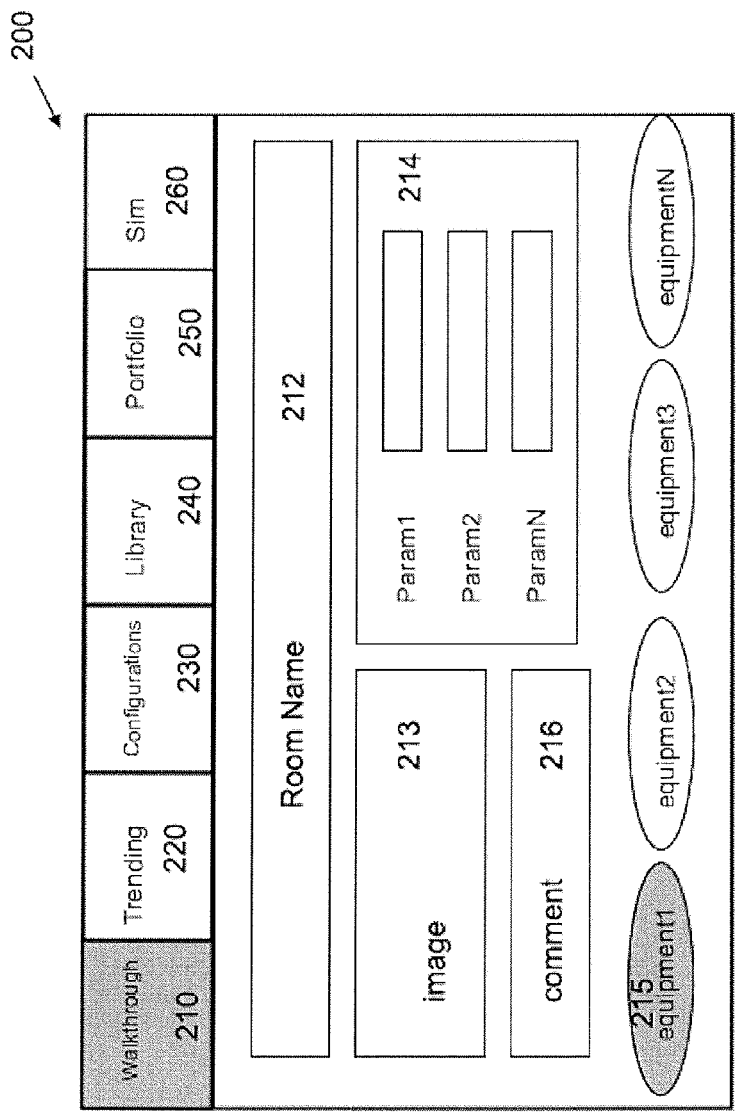
FIG. 7 shows an example of a possible user interface that may be presented on the mobile device.

FIG. 7 illustrates an exemplary screen of the GUI 200 when the walkthrough mode 210 is selected. This screen enables a user to be guided through a facility walkthrough room by room, clearly indicating data values that may be recorded for each facility component. The screen includes the name of the room 212, an image 213 of the selected facility component or the room, a data entry pane 214, and buttons 215 for selecting one of the available facility components in the room.

The image 213 and the room name 212 are optional. The buttons 215 may include labels that identify the corresponding facility components, which can be revised as necessary by the user. When the mobile device 330 includes a camera, the image 213 (or a video) may be captured using the camera. The room name 212 field may edited by the user to identify the room.

The data entry pane 214 includes one or more parameters and data entry fields corresponding to the parameters associated with the selected facility components. For example, the parameters and corresponding data entry fields for a UPS could include its current battery voltages, currents, power levels, power quality, temperatures, statuses, alarms, etc. The parameters and corresponding data entry fields are stored on the database 320 of the server 310 when the mobile device 330 is connected to the Internet (e.g., via WiFi).

In an exemplary embodiment of the invention, the data fields can be one of various field types, such as numeric (e.g., integer or decimal), a text string, an array of choices, or a checkbox. The text string may be input via a keyboard interfaced with the input/output subsystem of the mobile device 330 or a touch screen of a presentation subsystem of the mobile device 330. For example, the array of choices may be a selectable list box or dropdown menu with selectable items. Each item may be associated with or return a unique integer value when selected that corresponds to an index into an array that stores the items of the list/menu. The data field may also be a label with one or more selectable arrow buttons that allow the user to increment or decrement the value on the label by a predefined amount. Selection on the checkbox may be stored as an integer representing whether the checkbox has been checked (e.g. 1) or unchecked (e.g., 0).

The application of the mobile device 330 or the server 310 can maintain a data structure or object that corresponds to a facility component, which may comprise one or more of the above-described data fields. The equipment object (or facility component object) may include data regarding its name, type, image file location, its collection of fields, and a collection of document references. When an object is used, it may include access methods (e.g., object methods) that can be called by the mobile device 330 to set its data and read its data. The name may be a string representation of the name of the equipment/facility component (e.g., "Ferro-Resonant UPS", "Line-Interactive UPS", etc.)

The image file location is the string representation of an absolute or relative file path of the image file (e.g., a .png, .jpg) that may either be located within a memory file system of the mobile device 330, or a location on a memory file system of the server 310 that visually describes the equipment/facility component, which may have been captured by a camera of the mobile device 330. The collection of fields is a collection of field objects that pertains to the equipment/facility components. Likewise, the collection of documents is a collection of strings that point to the absolute or relative file path of the documentation files that may either be located within a file system of the mobile device 330, or a location on a memory file system of the server 310 that describe the structure, use, properties, or maintenance of the specific equipment/facility component.

Both fields and equipment/facility components may be used as collections within a facility room, which the mobile device or the server 330 can maintain using a room object. Room objects are facility component objects that have data regarding the name, image file location, a collection of fields, and a collection of documents for the particular room. Room objects may also have a collection of equipment/facility components, as mentioned previously, which is literally a collection of equipment/facility component objects whose data collection interfaces are spatially located within that room area. In addition, room objects may have data pertaining to its representation in the walkthrough data collection. For example, a room object may include a flag that indicates whether or not the room is required to be checked during a specific scheduled walkthrough, as well as data denoting the percentage of fields within the room and the fields within the equipment/facility components of the room that may have been completed (whether problematic or not) over all the fields within the room and its equipment/facility components.

Fields, equipment/facility components, and rooms may be used as collections within a facility area, which the mobile device 330 or the server 310 can maintain using an area object. An area is a specific dimension of facility space that separates the total collection of facility rooms into smaller collections. Each area object may have a name and an image file location for a picture representing that area. Areas are not only limited to different areas within the facility building itself, but also include rooftops and outside areas of a facility.

Fields, equipment/facility components, rooms, and areas may be used as collections within a facility, which the mobile device 330 or the server 310 can maintain using a facility object. The facility object itself may have a name, address, image file location, a collection of all its area objects, and a collection of all the actual document objects pertaining to the entire facility. All of the rooms and equipment/facility components may have a reference to the facility's master list of documents in order to link themselves to a specific document or collection of documents.

Fields, equipment, rooms, areas, and facilities may be used as collections within a client profile, which the mobile device or the server 330 can maintain using a software license object. The software license object itself may have an organization name, owner, license key, a collection of all its facility objects, and a collection of all the user objects working for or within the facility. Users of the application of the mobile device may be represented within the using user objects managed by the mobile device or the server 310. The user object itself may have a name and privileges.

The data entered into the fields may be stored in database in a memory of the mobile 330 device and in the database 320 of the server 310 when the mobile device 330 is connected to the Internet. When a walkthrough session is saved to the database, every room within the facility may be stored as a separate database table. A time stamp may be applied to each and every walkthrough session. Each record in that table may contain as columns every single field from that room and its equipment/facility components, as well as the time stamp of the walkthrough session. Every time a walkthrough session is saved, it may either overwrite the latest record within the table, or insert a new record into the table. If the current session being saved is a new session, it may insert a new record, but if it is a continued session that was previously saved it may overwrite the last record saved.

Each walkthrough session is saved in a manner which the mobile device or the server 310 may maintain using a walkthrough session object. The walkthrough session object itself may have a timestamp for when the session began and a timestamp for when the session ends, the user which performed the walkthrough session, and the data collected.

During walkthrough sessions, users may record information as comments attached to facility components. These comments may be maintained by the mobile device or the server 310 as a comment object. The comment object itself may contain a title, a message, a timestamp, an image, a user as an author, and a sound file.

When the application of the mobile device 330 is started, it may first retrieve the stored object-oriented data from its device memory or from the database 320 of the server 310. The encoded data for the facility and its areas, rooms, equipment/facility components, fields, users, comments, walkthrough sessions and documents may be decoded and recreated at runtime, after a user attempting to login to the application has been authenticated. Afterwards, if any synchronization to the remote database 320 is to be made, the last record from each table (e.g., each table may refer to a specific room within the facility) in the local database may update the values of all the fields within the facility's field objects. Also, as far as data analysis is concerned, an entire set of records across multiple timestamp ranges may be imported into the application from the remote database 320 for the sake of viewing, analyzing, and reporting trends throughout time across equipment/facility components and fields.

Data from a record set may be collected as an array of arrays (a two-dimensional array). In an exemplary embodiment, the first position of the two-dimensional array refers to the index of the record retrieved, uniquely identified by its timestamp, while the second position of the two-dimensional array refers to the column of the record retrieved. An embodiment of the application may point to and retrieve a specific data field collected from any time. In an exemplary embodiment, multiple record sets are obtained, one for each database table (e.g., one for each room), which a user may choose any collected data field from any time as far as the database record set allows.

The mobile device 330 or the server 310 may compare the entered parameter data against stored thresholds or previously entered data to determine whether an error has occurred. The thresholds may include a Maximum Threshold and a Precise Threshold. The stored thresholds may be stored on the server 310 for comparison by the server 310 or output from the server 310 to the mobile device 330 for comparison by the mobile device 330.

Data fields that conform to the Maximum Threshold may not exceed the nominal value (Xnominal). Warnings may be displayed on the GUI 200 when the data (Xactual) falls outside a tolerance value (PA) as shown by the following Equation 1:

$$X\text{actual} > X\text{nomimal} - (X\text{nominal}*T\%) \quad (1).$$

For example, if the tolerance value is 10%, the actual temperature of a boiler is 200 degrees, and the nominal value is 250 degrees, since an actual of 200 is not above 250−(250*0.1) (i.e., 200 is not above 225), no warning would be displayed. However, if the temperature had risen to 226 degrees in this example, a warning would have been displayed.

The mobile device 330 or the server 310 may also, or instead, average the previous logged data/parameter with the current entered parameter data, and compare this average value with a corresponding threshold to determine if a warning should be displayed. For example, if the current boiler temperature was entered at 226 degrees, but the prior 4 samples have the temperature at 200 degrees, since the overall average temperature is less than 226, no warning would be displayed. The amount of samples used for this averaging may vary and be a configurable parameter.

Data fields that conform to the Precise Threshold must not rise above or fall below the nominal value by more than the tolerance value. The GUI 200 may display a warning when data is outside of the tolerance as shown by the following Equation 2:

$$X\text{actual} > X\text{nominal} + X\text{nominal}*T\% \text{ AND}$$
$$X\text{actual} < X\text{nominal} - X\text{nominal}*T\% \quad (2).$$

If the value of the data field is beyond the threshold, then the value of the field is out of range and the system may alert the user. For example, if the tolerance value is 10%, the actual temperature of the boiler is 100 degrees, and the nominal value is 140 degrees, a warning would be displayed because an actual of 100 is less than 140-140*0.1 (e.g., 100 is less than 140-14). However, if the boiler temperature rises to 150 degrees a warning would not be displayed since it lower than 140+140*0.1.

If it has been determined that a warning is to be displayed, the mobile device 330 or the server 310 may notify the user to take corrective action to maintain the facility components before a failure occurs. The notification may appear as a visual on the GUI 200 or as audible alert. For example, parameter data for facility components that is outside of the threshold limits may be marked with visual cues. Further, different levels of alerts may be present. For example, a low level alert may become an elevated alert if new data is entered outside of a user configurable normal tolerance threshold. Since the error may have been caused by a data entry error, the user can choose to commit the data with the value as is, or edit the data before it is committed.

The notifications may be managed by selecting the configurations tab 230. For example, the interface 200 enables the user to indicate who should be contacted, the form used for the contact (e.g., SMS text message, MMS message, e-mail, social network message, etc.). For example, in addition to presenting the user of the mobile device 330 with a visual or audible notification, the mobile device 330 or the server 310 can notify the site administrator via an automatically generated email, text message, social network message, etc.

The configurations tab 230 may also enable the user to create a group of parallel redundant equipment. Once the redundant equipment group is created, equipment modules need to be added individually to the group. Redundant equipment modules must all be the same type of equipment (e.g., all UPSs, all Generators, etc.), and have the same capacity as defined when the group is created. The redundant equipment group for a facility is stored on the mobile device 330 and then backed up to the server 310 when the mobile device 330 is connected to the Internet. A redundant equipment group can be created from multiple Redundant Equipment groups to represent fully redundant systems. In this case, each sub group must be identical to the other (e.g., same equipment type, same capacity, same number of modules). The level of redundancy (N+X) is determined by the mobile device 330 or the server 310 based off of the total system capacity and each module's capacity. During configuration, the user specifies whether there are complete parallel redundant systems such as N, 2N, etc.

The mobile device 330 may enable the user to set the system into a training mode that prevents the mobile device 330 or the server 310 from sending a message to a remote party if it is determined that the facility components are not functioning properly.

The mobile device 330 and/or the server 310 may include a wireless transceiver and the mobile device 330 and/or server 330 may send a message using the wireless transceiver if it is determined that a facility component is not functioning properly.

The mobile device 330 may be configured to delete its locally stored data about the facility when it determines that it has left the facility. The determination of whether the device 330 has left the facility may be performed locally by the mobile device 330 or remotely by the server 310. The determination of whether the mobile device 330 has left the facility may be determined using GPS data of the mobile device 330. The deletion may be performed only by the mobile device 330 or in coordination with the server 310. For example, once the mobile device 330 or the server 310 has determined that the mobile device 330 has left the facility, when the mobile device 330 next engages in data synchronization with the server 310, the server 310 can inform the mobile device 330 to delete its locally stored data. GPS data can also be used to send the mobile device's 330 location to the server 310, allowing a user to locate and recover the device, or the server 310 to track the user's location.

The user may record comments in the comment field 216 for each room for each facility component within the room. When the camera is present within the mobile device 330, it may be used to record one or more pictures that are automatically associated with the comment. The comments and associated pictures may be stored on a local database of the mobile device 330 or the remote database 320 of the server 310. For example, if the user notices that the temperature of the boiler is too high, he can provide a corresponding comment and snap a photo of the instrument panel of the boiler showing the elevated temperature.

Once sufficient data has been captured by the mobile device 330, the user may select the trending mode 220 to access a visual representation of all data. In this visual representation, each data field may be graphed against its threshold limits and an estimated prediction trend line may be illustrated to show if and when the thresholds may be exceeded. The graphing may be performed by the mobile device 330 or the server 310.

Analysis of the data may reveal opportunities for the user to take corrective action to maintain facility components before a failure occurs. The analysis may be performed by the mobile device 330 or the server 310.

The trending may identify spikes and dips in recorded data as anomalies. The anomalies may be used as a basis of analysis where related data fields are analyzed for anomalies occurring during the same time period. Correlation between anomalies occurring during the same time period may provide a basis for corrective actions to locate and address the issue.

The mobile device 330 or the server 310 may trend data input by the user during a walkthrough data collection session. A data trending activity fragment (e.g., software executed and stored on the mobile device 330 or the server 310) may first retrieve historic data from a database (e.g., mobile device database or remote database 320) up to a specified range of time defined by the user, by means of the data retrieval mechanism detailed previously. The data trending activity fragment may then calculate the positive and negative slopes of the sinusoidal curves that were created by the obtained information. The data trending activity fragment may be able to calculate transients (voltage spikes, current spikes, brownouts) by using the trends generated by the data collected. If such problematic transients are implied by the generated trends, the data trending feature may pinpoint the facility components or location of the issue within the facility.

The trending mode 220 may also be used to generate a report of the collected data stating a brief analysis of said trends or anomalies, and may also include a printout of the data of the selected fields in graphical and tabular format.

When the user enters data in each field presented on the mobile device 330, and when each room is completed and the user commits the data, the mobile device 330 or the server 310 will analyze the newly entered data, compare it with past data, and provide feedback.

After data is entered in each data field, if data is outside of a normal operating range (e.g., user defined % tolerance), the data field can be graphically modified by the mobile device 330 or the server 310 to indicate the data is outside of the proper range (e.g., the value could be colored red, an 'x' would be presented next to the value, etc.). The normal operating ranges may be stored on the server 310 so the server 310 can compare the data entered into the fields against the stored operating ranges. The normal operating ranges may be output from the server 310 to the mobile device 330 so that the data entered into the fields can be compared by the mobile device 330 against the stored operating ranges.

When the room data (e.g., all data entered for the room) is committed to the local or the remote database 320, if any data is determined to be outside the normal operating range by the mobile device 330 or the server 310, and alert is displayed on the mobile device 330 to notify the user of the anomaly. The user can submit the data with the value as is even though it caused the error, or correct the issue with the data field and edit the data with a new value.

When the room data (e.g., all data entered for the room) is committed to the local or the remote database 320, the mobile device 330 or the server 310 is configured to analyze any redundant groups for equipment in the room. A redundant system or group is a set of equipment in a room that is identified as being redundant to another set of equipment in the room or another room. If equipment loading is determined by the mobile device 330 or the server 310 as approaching a level where the system (i.e., a system within the facility) load is near the capacity of the redundant system, an alert can be displayed to notify the user of the anomaly. The user can submit the data with the value as is even though it caused the redundancy error, or correct the issue with the data field and edit the data with a new value.

In an exemplary embodiment, regardless of whether the user submitted the value as is or decided to change the value, the anomaly is escalated to a site administrator (e.g., an email, text message, social network message, etc., is sent). For example, if the value entered that is causing an error is correct, and the user decides to change the value just to satisfy the error, without notifying the site administrator, an actual problem would be hidden.

When an alert is generated, an escalation process of the mobile device 330 or the server 310 sends a message (e.g., an automatically formatted email, text message, social network message, etc.) to user definable or predefined (e.g., stored locally on mobile device 330 or server 310) recipients. In an exemplary embodiment, the message includes a subject line or section that identifies the equipment (e.g., an equipment identifier), identifies the alert type, condition, etc. The message includes a body section that may indicate at least one of the specific problem or anomaly encountered, more specific details about the problem, the identity of the person or user that input the data that caused the error, the value of the data entered, the parameter in which the data was entered, etc.

In an exemplary embodiment of the invention, the mobile device 330 or the server 310 provides an automatic alert tracking system. If one of the above-described alerts is generated, the alert tracking system creates a corresponding entry or an open ticket that can be accessed by other mobile devices 330. If the alert is a duplicate (e.g., the same equipment voltage field has exceeded its threshold for multiple walkthroughs), information about the alert is added to the existing ticket. For example, if a voltage field of a piece of equipment has exceeded its threshold on a walkthrough at 12 pm and at fpm, there could be a single open ticket that would identify the equipment, and list two occurrence of the data field exceeding its set threshold. In an exemplary embodiment, the server mobile device 330 or the server 310 links each data field to its alerts. For example, if no errors have been encountered for a data field, the data field could be associated with a null alert pointer, and if errors were encountered, the alert pointer would point to a location in local memory of the device 330 or remote memory of the server 310 that lists the corresponding alerts.

Tickets are used to track responses performed in response to alerts. In an exemplary embodiment, tickets are marked as one of "Unaddressed", "Pending Approval", "Work Scheduled", "Repairs in Progress", "Completed/Resolved". A ticket marked as unaddressed is the default state when a ticket is created before it is viewed by a manager. When a ticket is in the Pending Approval state, a manager has viewed the alert and submitted a request for repair. When the ticket is in the Work Scheduled state, the repair has been approved and scheduled. When a ticket is in the Repairs in Progress state, repair work has started. When the ticket is in the Completed/Resolved state, work has been completed and cause of the alert has been resolved. The ticket is then closed and can be archived. In an exemplary embodiment, whenever a ticket's status is updated (e.g., its state changes), an alert message (e.g., an email, text, social network message, etc.) is sent to a manager level user.

The below Table 1 is an example of a data type table that can be maintained by the mobile device 330 or the server 310. The data types listed are provided as an example, as a greater or a lesser number of data types may be maintained. The table maintains a threshold type for each data type (e.g., Precise or Maximum) that indicates which of the above-described equations is to be used in calculating the corresponding threshold. Additional threshold types may also be present.

TABLE 1

| Data Type | Variable | Unit | Threshold Type | Default Tolerance |
|---|---|---|---|---|
| Voltage | V | Volt (V) | Precise | 10% |
| Current | I | Ampere (A) | Maximum | 10% |
| Real Power | P | Watt (W) | Maximum | 10% |
| Reactive Power | Q | Volt-Ampere (VA) | Maximum | 10% |
| Temperature | T | Degrees Fahrenheit (° F.) | Precise | 10% |
| Humidity | H | Percent (%) | Precise | 5% |
| Max Load with redundancy | L | Varies | Maximum | 5% |

In an exemplary embodiment of the invention, the mobile device 330 or the server 310 is configured to calculate the maximum load with redundancy L according to Equation 3 as follows:

$$L = \frac{C_N(M - R_c)}{R_s} \tag{3}$$

where $C_N$ is the capacity of each redundant module, M is the number of redundant modules, $R_C$ is the specified component redundancy, and $R_S$ is the specified subsystem redundancy that will be evaluated. The units of the capacity may be current (amps), real power (watts), reactive power (VA), etc. In an exemplary embodiment, the component redundancy $R_C$ is defined as the number of additional redundant components within the facility, beyond the absolute minimum N required to support the load of a system in the facility, and may be represented by Expression 4.

$$N + R_c \tag{4}$$

The system redundancy $R_S$ is defined as the number of parallel systems, each of which is capable of supporting the entire load, and is represented by Expression 5.

$$R_S(N + R_C) \tag{5}$$

The collected data for a redundant group is compared with the equation results to provide an assessment of the redundancy of the group.

Figure 8:
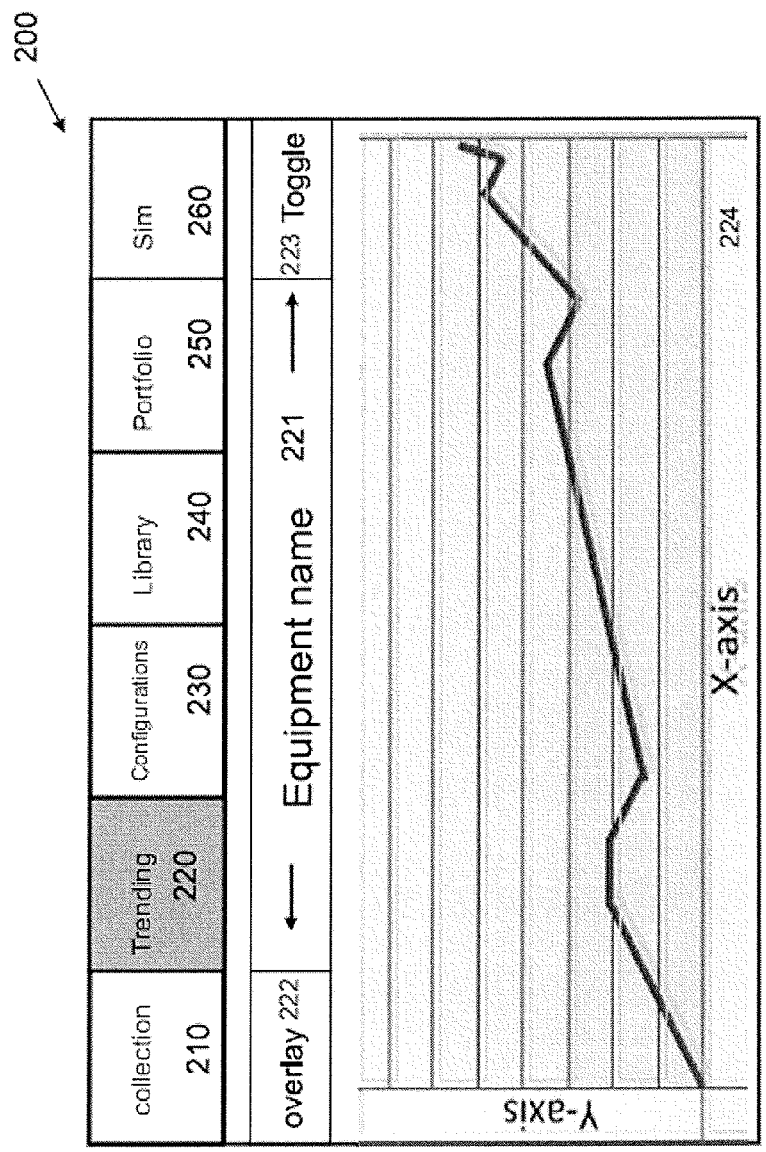
FIG. 8 shows an example of a possible user interface that may be presented on the mobile device.

FIG. 8 shows an exemplary user interface displayed on the mobile device 330 when the trending mode 220 is selected. When the trending mode is selected, the mobile device 330 or the server 310 is configured to calculate anomalies. These anomalies may be divided into anomalies of different severities, such as a prediction anomaly, a warning anomaly, and a critical anomaly. The prediction anomaly is discovered by performing analytics on a predicted trend line for the data. The timeline for a prediction anomaly is in the future. A warning anomaly is an anomaly that does not pose an immediate risk to the equipment. A critical anomaly poses a risk to the equipment and/or critical loads supported by the equipment and needs to be addressed immediately. Examples of the anomalies include a spike condition, a valley condition, an outside of threshold condition, an exceeded nominal threshold condition, and a change of redundancy condition.

A spike condition occurs when there is a single data point that is significantly higher than the benchmarked average of other recent points. For example, any value that exceeds the mean by greater than a single standard deviation of the provided data set is considered a spike.

The valley condition occurs when there is a single data point that is significantly lower than the benchmarked average of other recent points. For example, any value that is less than a single data point by greater than a single standard deviation of the provided data set is considered a valley.

The outside of threshold condition occurs when the data has exceeded its threshold value, but it has not exceeded the nominal value (e.g., a UPS is 90% loaded).

An exceeded nominal condition occurs when the data has exceeded its nominal value, which is applicable only for values conforming to a maximum threshold (e.g., a UPS is 105% loaded). Any value that exceeds the equipment nominal value is an exceeded nominal anomaly.

A change of redundancy condition occurs when redundant systems become loaded such that it will affect the redundancy of the overall system. For example, assume an (N+1) redundant UPS system is present with three UPS modules rated at 50 kVa each, and under normal circumstances, the system operates with each UPS at 30 kVa for a total load of 90 kA. If one UPS fails, the remaining ones provide 45 kVa, which does not exceed their capacity. However, over time, the load increases to 40 kVA on each UPS for a total load of 120 kVa, a single failure would cause each UPS to exceed their capacity, which might cause each UPS to shutdown due to be being overloaded. Thus, the system would no longer be an (N+1) system.

As shown in FIG. 8, the interface displays an equipment label 221 identifying the equipment (e.g., a facility component), an overlay button 222, and a toggle button 223. The arrows to the left and right of the equipment name 221 may be used to advance to a preceding or subsequent piece of equipment in the room. The trending mode 220 interface may also enable the user to specify equipment data fields and date ranges to be displayed on the graph for comparison of past and present data. The toggle button 223 can be used to toggle the view of the data between the graphical view and a tabular view.

Figure 9:
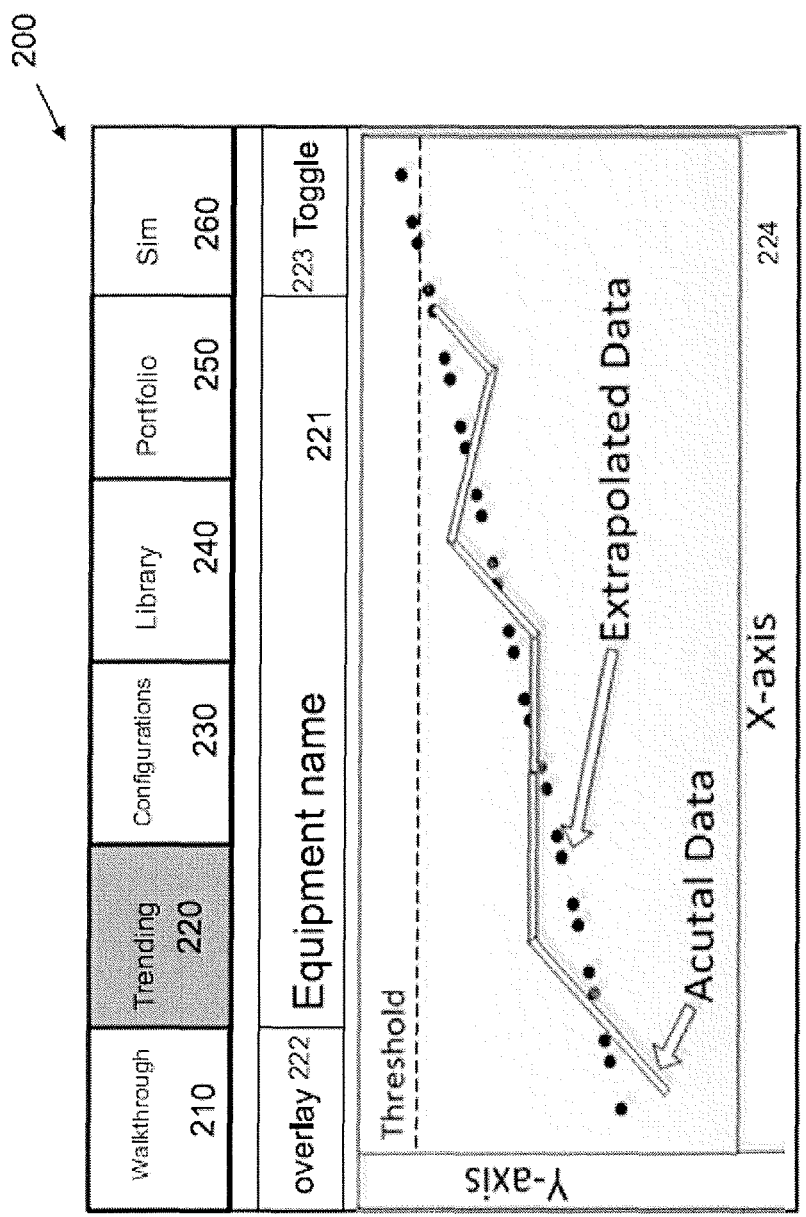
FIG. 9 shows an example of a possible user interface that may be presented on the mobile device.

The overlay button 222 can be used to view an overlay of projected equipment loading values to identify trends in data that was collected, as shown in FIG. 9. As an example, the graph 224 can display one data parameter of a piece of equipment over time, and against the threshold or capacity limits, and an estimated (e.g., extrapolated) trend line will show if and when the thresholds may be exceeded. This information may aid the user in identifying system capacity trends as new facility components are added to the facility. The user may select equipment data fields to be displayed and analyzed on the data trending graphs. These graphs may be overlaid on the same set of axes for data comparison. The interface 200 may highlight increasing and decreasing trends for the user.

In the portfolio mode 250, the mobile device or the server 310 may be configured to generate reports of the collected data, a brief analysis, and an overview of the data that was entered for selected fields. The mobile device 330 may enable the user to generate a full report based on the entered data. The system may be able to manage multiple facilities data, functionalities and components.

The document library mode 240 can be selected to access one or more documents such as SOPs, EAPs, EOPs, MPs, MOPs, drawings, schematics, or other relevant documentation associated with facility components in the corresponding room or the facility. These documents may be maintained on the server 310 and uploaded for local storage on the mobile device 330. These documents may be accessed in a "step by step" mode of the interface 200 on a display of the mobile device 330 that guides the user through each step in a procedure of a corresponding one of the documents.

For example, text of the steps that have been completed and the subsequent steps can be displayed on the display, where the next step to be completed can be emphasized (e.g., highlighted in a different color, underlined, etc.). The interface 200 may enable the user to mark each step as complete. For example, the interface 200 may provide a check box next to each step that can be selected when the user has finished that part of the procedure. The mobile device 330 can send a message to the server 310 notifying the server that the selected step has been completed when the mobile device 330 is connected to the Internet. Thus, a user with another mobile device 330 upon downloading the most recent state of the facility can pick up where the prior user left off and continue the procedure. The user may also be notified if a step has been skipped. The "step by step" mode may reduce confusion during an emergency by guiding the user in a high stress environment, which may also increase safety.

The user may also access electrical and mechanical one-line diagrams and other various important operational drawings including floor layouts, etc. These documents may also be used to facilitate practice simulations that may reduce risk and improve life safety. The documents may be maintained on the server 310 for upload to the mobile device 330.

The document library mode 240 may be selected to provide personnel with immediate access to important facility drawings (e.g., electrical one line diagrams, floor plans, and mechanical drawings, etc.), emergency operating procedures, and other pertinent information to keep operations running smoothly. This document library mode 240 is not limited to providing emergency related information, as it may also provide pertinent information on switching procedures, technical maintenance programs, and other operations procedures, facility one lines, and other facility infrastructure drawings including SOPs, EAPs, EOPs, MPs, MOPs, etc. Further, other documentation may be imported from a remote server and saved into the application locally, which allows use of the data without network connectivity.

Figure 10:
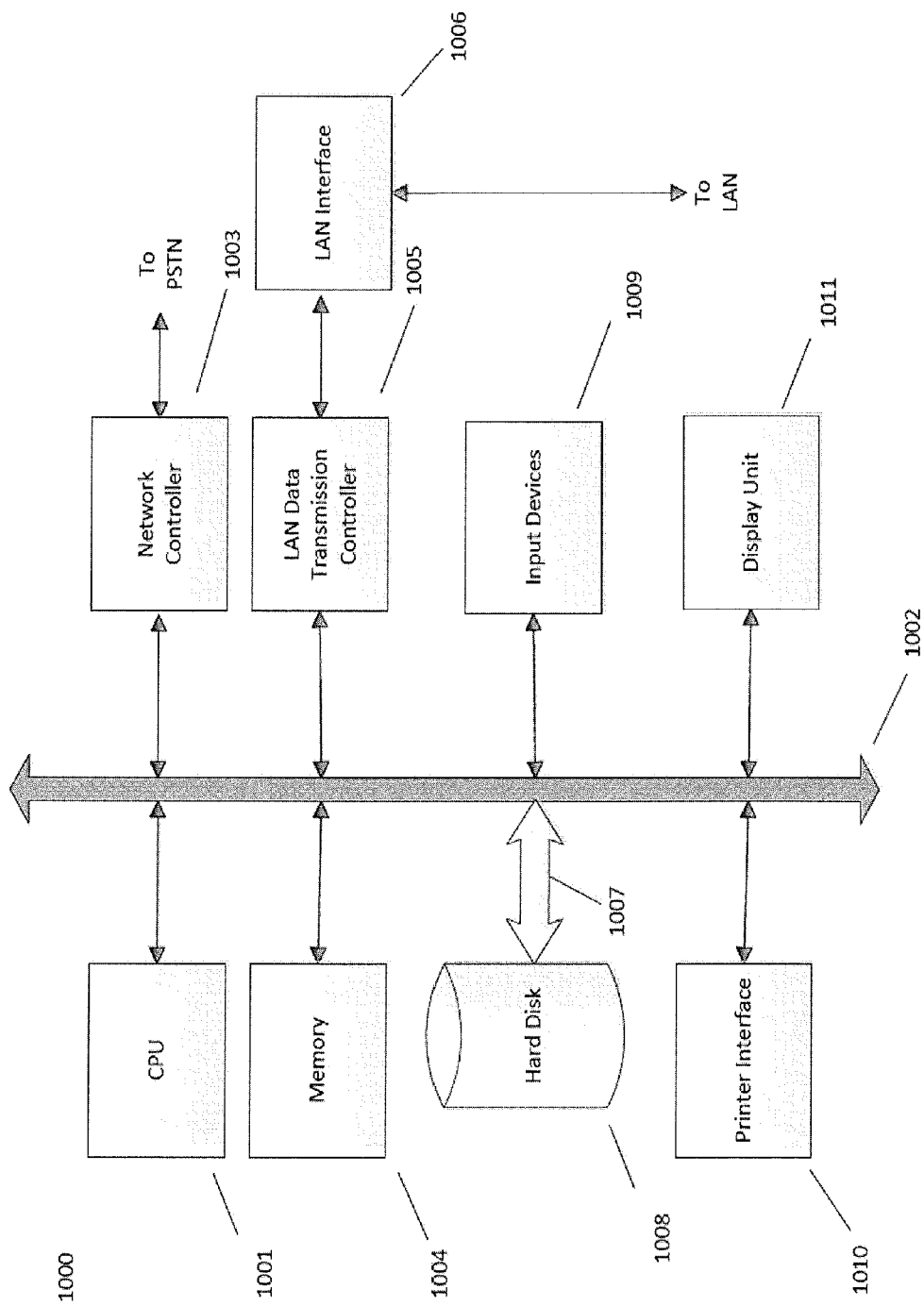
FIG. 10 shows an example of a computer system capable of implementing the server or methods performed by the server according to embodiments of the present invention.

Referring to FIG. 10, the server 310 may be embodied by system 1000 and may include, for example, a central processing unit (CPU) 1001, random access memory (RAM)

1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A computer system configured to enable users to maintain a facility, the computer system comprising:
   a computer server configured to communicate across a computer network with a plurality of mobile devices, wherein each mobile device is pre-configured for one of a plurality of different facilities; and
   a database configured to store facility data about the facilities identifying sets of equipment within each facility that a user is required to perform a maintenance check on, and parameter data associated with the equipment that is set by a user through a given one of the mobile devices during the maintenance check,
   wherein the computer server enables the mobile devices to read data from the database or insert new data into the database in response to requests received from the mobile devices,
   wherein when a given one of the requests indicates that the maintenance check has been completed by a given one of the mobile devices, the computer server processes the one request by inserting the parameter data into the database for the facility associated with the given mobile device from values provided in the given request,
   wherein a given one of the requests causes the computer server to output a threshold to the mobile device that made the request, and the mobile device is configured to present a warning when the parameter data set by the user is outside the threshold.

2. The computer system of claim 1, wherein the computer server is further configured to communicate across the network with a configuration computer, wherein the computer server prevents the mobile devices from deleting or updating existing data from the database in response to the requests, and wherein the computer server is configured to enable the configuration computer to delete or update the existing data.

3. The computer system of claim 1, wherein the computer server sends a message to the given mobile device that sent the given request indicating the given request has already been processed when the server determines the given request has already been processed.

4. The computer system of claim 1, wherein the server comprises:
   a web presentation layer to interface with a browser of the configuration computer;
   a dynamic presentation layer configured to interface with a static presentation layer of each mobile device and the web presentation layer; and
   a data access layer to interface with a database layer of the database.

5. The computer system of claim 1, wherein the computer server comprises:
   a hypertext transfer protocol (IMAP) and reverse proxy server; and
   an Internet Message Access Protocol (IMAP)/Post Office 3 protocol (POP3) proxy server.

6. The computer system of claim 1, wherein the dynamic presentation layer is based on a Node.js platform.

7. The computer system of claim 1, wherein the database comprises:
   a relational model database system (RDMBS) configured to store the facility data and the parameter data; and
   a NoSQL database configured to store procedures associated with each of the facilities.

8. The computer system of claim 7, wherein the RDMBS stores data representative of each facility that includes an identifier that corresponds to a code readable from a tag within the corresponding facility.

9. The computer system of claim 1, wherein when a given one of the mobile devices is newly added to the system, the server pushes all the facility data of the facility associated with the given mobile device to the given mobile device.

10. The computer system of claim 1, wherein the computer server maintains a threshold indicating a number of mobile devices supported by the system, and the computer server ignores the requests from a new mobile device when an existing count of the mobile devices equals the threshold.

11. The computer system of claim 1, wherein the computer server is configured to communicate with the mobile devices using a Java Script Object Notation (JSON).

12. The computer system of claim 10, wherein the server comprises a web server that maintains a different PHP page for each type of the requests, the web server determines the type of a given one of the requests from a given one of the mobile device using an HTTP post in the given request, and forwards the post to the corresponding PHP page that returns a JSON response to the given mobile device.

13. The computer system of claim 1, wherein a given one of the requests causes the computer server to output a threshold to the mobile device that made the request, and the mobile device is configured to present a warning when the parameter data set by the user is outside the threshold.

14. The computer system of claim 1, wherein a given one of the mobile devices enables a user to create a group of parallel redundant equipment for backup on the server when the given mobile device is connected to the server, where all equipment in the group is of a same type and has a same capacity.

15. The computer system of claim 14, wherein the server is configured to determine of a level of redundancy of a corresponding one of the facilities based on the group and a total capacity of the facility.

16. The computer system of claim 1, wherein the server is configured to delete data stored locally on a given one of the mobile devices for a given one of the facilities when the server determines that the given mobile device is further than a predetermined distance from a location of the given facility.

17. The computer system of claim 1, wherein the server is configured to plot a curve from the parameter data entered over a given period of time for a given one of the facilities, calculate slopes of the curve to determine whether a spike or a dip has occurred in a given parameter of the equipment, and output a warning when the spike or dip is determined to have occurred.

* * * * *